Figure 1:
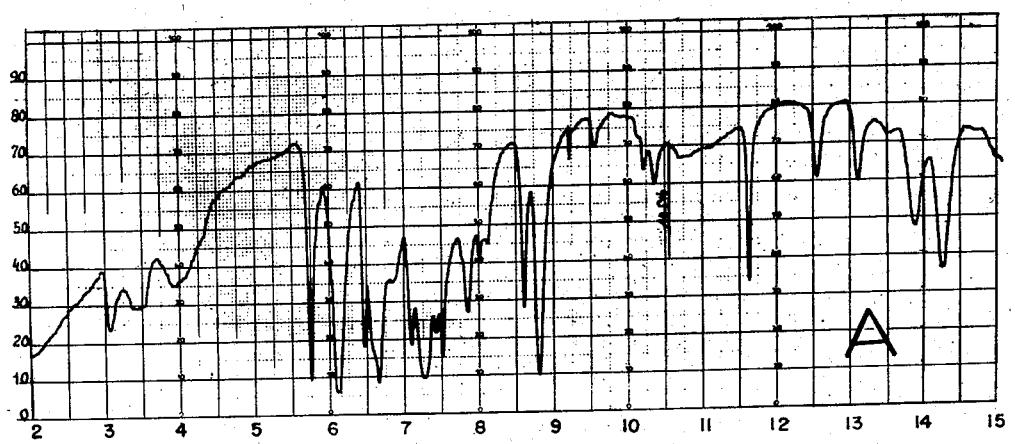
Figure 2:
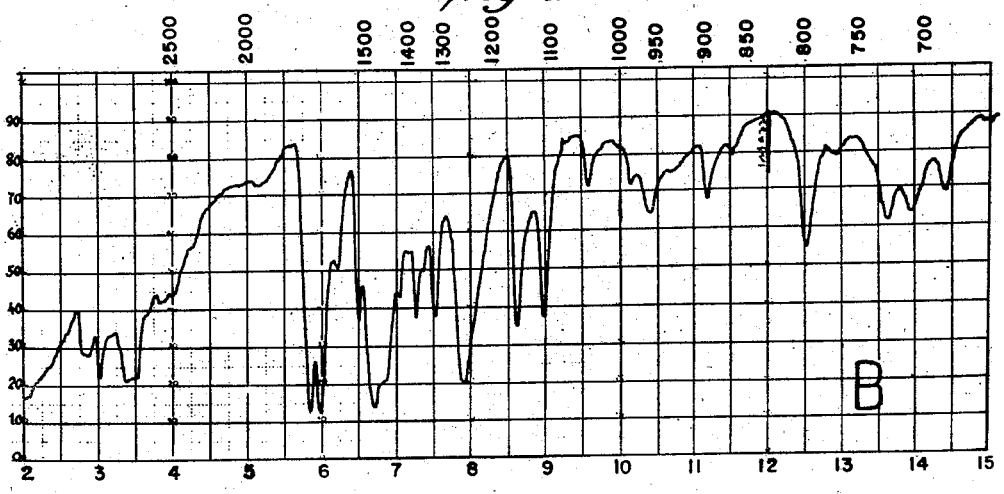

United States Patent Office 2,853,424
Patented Sept. 23, 1958

2,853,424

X-RAY CONTRAST AGENTS COMPRISING SYMMETRICAL BIFUNCTIONAL ANALOGS OF N-ACYL DERIVATIVES OF 2,4,6 TRIIODO-3-AMINO BENZOIC ACID

Hans Priewe, Berlin-Steglitz, and Rudi Rutkowski, Hiltrup, Germany, assignors to Schering A. G., Berlin, Germany, a corporation of Germany Application October 26, 1956, Serial No. 618,530

Claims priority, application Germany August 6, 1952

4 Claims. (Cl. 167—95)

This invention relates to X-ray contrast agents and their manufacture and in particular to new N-acyl-3-amino-2,4,6-triiodobenzoic acids of which the N-acyl residue is derived from a polybasic carboxylic acid, and salts, and functional carboxyl derivatives, such as esters and amides, of such compounds.

The present application is a continuation-in-part of our copending application Serial No. 369,192, now U. S. Patent No. 2,776,241, filed July 20, 1953, and entitled "X-ray Contrast Agents."

One object of this invention is to provide new preparations which are excellent, non-irritating, heat sterilizable, X-ray contrast agents that permit X-ray visualization of various parts of the human body, especially of kidney, bladder and urethra, gall bladder, heart, blood vessels and others.

Still another object of the present invention is to provide new X-ray contrast agents of the formula

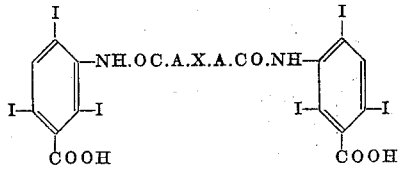

wherein X indicates a member selected from the group consisting of oxygen and sulfur and A indicates alkylene radicals having 1 to 3 carbon atoms.

Other objects and advantageous features of this invention will become apparent as the description proceeds.

By reaction of 2,4,6-triiodo-3-aminobenzoic acid with acid halides or with ester acid halides or with N-substituted or unsubstituted amide acid halides of polybasic carboxylic acids, especially of dibasic carboxylic acids such as dibasic alkanoic acids the alkyl chain of which is interrupted by at least one sulfur or oxygen or nitrogen atom, compounds are obtained which correspond to the above indicated formula.

It has been found that these compounds are good X-ray contrast agents and are especially suitable for X-ray visualization of intra- and extrahepatic bile ducts, gall bladder and for examination of function of sphincter oddi.

The compounds can be used in the form of their salts, especially the alkali salts or the salts with non-toxic organic bases.

As is evident, compounds of this type of X-ray agents are characterized by the presence of one or several polyvalent hetero atoms, such as oxygen and/or sulfur, in the carbon atom chain A. X. A., of the above given formula. Said hetero atoms interrupt said carbon atom chain. Compounds of this type may, of course, also be substituted by other substituents, such as halogen, especially iodine, hydroxyl, oxo, amino groups or functional derivatives of such groups, as stated above.

Compounds of said type having a carbon chain interrupted by a hetero atom are, for instance, produced by condensing triiodo amino benzoic acid or functional derivatives of the carboxyl group thereof, with suitable polybasic carboxylic acids, such as acids of the type of diglycolic acid

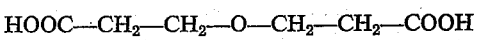

thiodiglycolic acid HOOC—CH₂—S—CH₂—COOH, dithiodiglycolic acid HOOC—CH₂—S—S—CH₂—COOH, thiodihydracrylic acid

and similar polycarboxylic acids.

The following examples serve to illustrate the present invention, without, however, limiting the same thereto.

Example 1

910 g. of dry 2,4,6-triiodo amino benzoic acid are dissolved with stirring in 4800 cc. of dry, boiling chlorobenzene. A solution of 151.7 g. diglycolic acid dichloride in 100 cc. of dry chlorobenzene is slowly added to said solution and the mixture is further heated for 4–5 hours under reflux until development of hydrogen chloride has ceased. The resulting precipitate is filtered from the warm solution with suction and washed with chlorobenzene and then with ether. The microcrystalline, almost colorless crude product, 942 g., consists of the α-modification of diglycolic acid di-(3-carboxy-2,4,6-triiodo anilide) of the formula given hereinafter.

The crude product is suspended, while stirring, in 2.5 liters of pure methanol and a solution of 73 g. of pure sodium hydroxide in the same weight of water, diluted with 675 cc. methanol, is slowly added to this suspension till the acid is dissolved and the pH of this solution reaches 9.0. The solution is allowed to stand at this pH for 15 minutes. The pH is then brought to 4.0 by addition of 10% acetic acid and 17 g. of charcoal are stirred in. After 15 minutes the coal is filtered off and the clear filtrate is slowly added to a stirred solution of 415 cc. of pure, concentrated hydrochloric acid in 4.15 liters of 50% methanol. After ½ hour of stirring and decanting after 1 hour, the precipitate is easily filtered off with suction, washed with little methanol and thoroughly with water, until the thixotropic residue is free of hydrochloric acid. In order to obtain a product of highest purity, this treatment is repeated two times. The resulting pure product, after drying in vacuo at 50° C. still containing one molecule of methanol per two molecules of the acid (plus 4 molecules of water), must be suspended in boiling water and steamed out. The hot suspension is filtered with suction, the white, microcrystalline residue is dried in vacuo at 50° C. to give 860 g. (83.5% of the theoretical yield) of the pure dihydrate of the diglycolic acid di-(3-carboxy-2,4,6-triiodo anilide), β-modification.

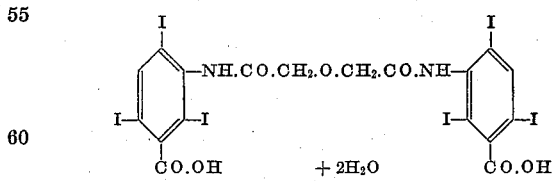

M. P.: baking 222° C., sintering 227° C., splitting off of iodine 245° C., complete decomposition 281° C.; infra red spectrum, see the accompanying drawing, diagram B; ultraviolet spectrum: extinction at the characteristic peak $\epsilon_{238}$ 69,000 (referring to waterfree acid); by intravenous application in rats in form of its neutral di-sodium salt the LD 50 is 6.8 g./kg., i. e., half the toxicity of that of adipic acid di-(3-carboxy-2,4,6-triiodo anilide).

The α-modification, represented by the same formula, but without water of crystallization, shows the same ultraviolet spectrum and extinction as the β-form, but the infra red spectrum is greatly different (see the accompanying drawing, diagram A). M. P.: 297/298° C. under decomposition.

The crude α-modification as described hereinabove is easily transformed in the β-modification by dissolving the α-acid and allowing the solution to stand in alkaline solution for short time, whereafter mineral acids precipitate the β-acid. On the other hand, by boiling a suspension of the β-acid in chlorobenzene for 24 hours under reflux, the pure α-acid is obtained. These transformations seem to correspond to hydrate-isomerism.

*Example 2*

5.6 g. of thiodiglycolic acid dichloride are introduced dropwise into a boiling solution of 50 g. of 2,4,6-triiodo-3-amino benzoic acid in 150 cc. of chlorobenzene. After about 3 hours evolution of hydrochloric acid has ceased. The precipitated crude thiodiglycolic acid di-(3-carboxy-2,4,6-triiodo anilide) of the formula

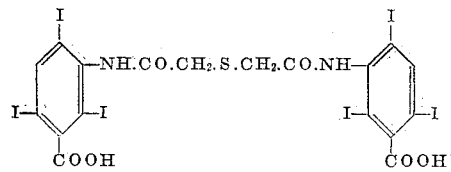

is filtered with suction and washed with ether. For purification, the compound is dissolved in N caustic soda solution, filtered over charcoal, and precipitated with hydrochloric acid; M. P. 263–265° C. (with decomposition); yield: 26.3 g.

*Example 3*

206 g. of dry 2,4,6-triiodo amino benzoic acid are dissolved in 1 liter of dry, boiling chlorobenzene and a solution of 43 g. thio dihydracrylic acid dichloride in 30 cc. of dry chlorobenzene is added thereto within 30 minutes, while stirring. After 2 hours of further boiling under reflux the precipitated crude product is filtered with suction, washed with chlorobenzene and ether, and dried. The 210 g. of crude product are suspended in water, dissolved by addition of 2 N sodium hydroxide solution, treated with charcoal, and filtered. The clear filtrate is stirred in N hydrochloric acid, the precipitate is filtered with suction, and washed with water free of hydrochloric acid. This procedure is repeated once again, and after drying on the air 176 g. (73% of the theoretical yield) of pure thio-dihydracrylic acid di-(2,4,6-triiodo anilide) monohydrate are obtained. M. P.: 230/232° C. under decomposition.

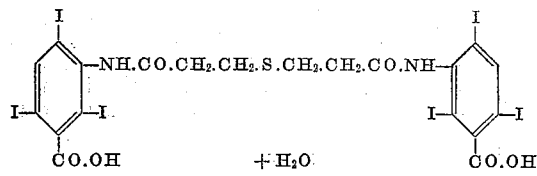

As reaction components in which the carbon chain is interrupted by a hetero atom, there may be used in the place of thio diglycolic acid chloride of Example 2 and of diglycolic acid dichloride of Example 1, other halogenides of similar constitution and the corresponding acid ester halogenides, such as, for instance, the halogenides of thio dilactic acid

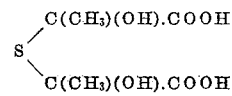

γ-thio dibutyric acid, thio dihydracrylic acid, cystine, β-dithio dipropionic acid, and others.

Soluble salts of these new X-ray contrast agents are preferably used in aqueous solution whereby the concentration is preferably between about 30% by volume and about 60% by volume. These solutions are especially adapted for use in intravenous cholangiography.

Of course many other changes and variations in the reaction components used, the reaction conditions, reaction time and temperature employed, the solvents used, the methods of working up and of purifying the reaction products and their salts and functional derivatives, and the like, may be made by those skilled in the art in accordance with the principles set forth herein and in the claims annexed hereto.

We claim:
1. An X-ray contrast agent comprising diglycolic acid di-(3-carboxy-2,4,6-triiodo anilide).
2. An X-ray contrast agent comprising thio-diglycolic acid di-(3-carboxy-2,4,6-triiodo anilide).
3. A new X-ray contrast agent comprising thio-dihydroacrylic acid di-(2,4,6-triiodo anilide).
4. X-ray contrast agent selected from the group consisting of an N-acyl derivative of 2,4,6-triiodo-3-amino benzoic acid of the formula

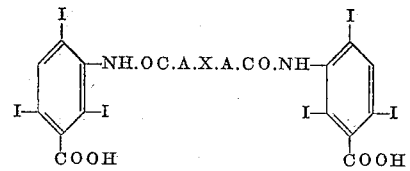

wherein X indicates a member selected from the group consisting of oxygen and sulfur, and A indicates alkylene radicals having 1 to 3 carbon atoms, and the substantially non-toxic salts of such an acid with alkali metals, ammonia, alkaline earth metals, and organic bases.

References Cited in the file of this patent
UNITED STATES PATENTS

| 2,606,922 | Papa et al. | Aug. 12, 1952 |
| 2,776,241 | Priewe et al. | Jan. 1, 1957 |